US012775457B2

(12) United States Patent
Ravichandran et al.

(10) Patent No.: US 12,775,457 B2
(45) Date of Patent: Oct. 27, 2026

(54) UNIFIED CODE IMAGE DEPLOYMENT ARCHITECTURE

(71) Applicant: Dell Products L.P., Round Rock, TX (US)

(72) Inventors: Arun Kumar Ravichandran, Chennai (IN); Soumyasri Radhakrishnan, Chennai (IN); Pooja Saxena, Gwalior (IN); Koyyana Sravani, Visakhapatnam (IN); Achyutha Vishnuvardhan, Markapur (IN); Kavitha Govindasami, Chennai (IN)

(73) Assignee: Dell Products L.P., Round Rock, TX (US)

( * ) Notice: Subject to any disclaimer, the term of this patent is extended or adjusted under 35 U.S.C. 154(b) by 236 days.

(21) Appl. No.: 18/675,411

(22) Filed: May 28, 2024

(65) Prior Publication Data

US 2025/0370741 A1 Dec. 4, 2025

(51) Int. Cl.
*G06F 8/61* (2018.01)
*G06F 8/41* (2018.01)
*G06F 9/455* (2018.01)

(52) U.S. Cl.
CPC ................ *G06F 8/63* (2013.01); *G06F 8/447* (2013.01); *G06F 9/45533* (2013.01)

(58) Field of Classification Search
CPC ......... G06F 8/447; G06F 8/63; G06F 9/45533
USPC .................................................. 717/168–178
See application file for complete search history.

(56) References Cited

U.S. PATENT DOCUMENTS 8,171,116 B2 * 5/2012 Pichetti ............... H04L 41/0853 709/227
9,104,504 B2 * 8/2015 Chow ....................... G06F 8/54
11,354,106 B2 * 6/2022 Trossen .................... G06F 8/61
(Continued)

OTHER PUBLICATIONS

Kalviainen et al., "Houghtool—A software package for the use of the Hough transform", 1996, Elsevier, pp. 889-897. (Year: 1996).*
(Continued)

*Primary Examiner* — Ted T. Vo
(74) *Attorney, Agent, or Firm* — Ryan, Mason & Lewis, LLP

(57) ABSTRACT

Methods, apparatus, and processor-readable storage media for a unified deployment architecture are provided herein. An example method includes obtaining a first package, associated with one or more software components, and information identifying a target computing environment for deploying the software components on the target computing environment, where the first package is obtained in a first file format. The method includes extracting, from the first package, configuration parameters and image files associated with the software components, and selecting a conversion process, from among a set of conversion processes, based on the target computing environment. The method also includes generating a second package for deploying the software components on the target computing environment, where the generating includes converting the image files into a second file format and generating instructions for deploying the software components on the target computing environment, and automatically initiating one or more deployment tasks based on the second package.

20 Claims, 7 Drawing Sheets

(56) References Cited

U.S. PATENT DOCUMENTS

| | | | | |
|---|---|---|---|---|
| 12,346,703 | B1 * | 7/2025 | Desrosiers | G06F 16/113 |
| 2024/0345823 | A1 * | 10/2024 | Bouat | G06F 8/60 |

OTHER PUBLICATIONS

Carzaniga et al., “A Characterization Framework for Software Deployment Technologies”, 1998, University of Colorado, 24 pages. ( Year: 1998).*

Christopher et al., “DFBIdb: A Software Package for Neuroimaging Data Management”, 2010, Springer, pp. 273-284. (Year: 2010).*

VMware, “vSphere Virtual Machine Administration”, available at: https://docs.vmware.com/en/VMware-vSphere/7.0/vsphere-esxi-vcenter-server-703-virtual-machine-admin-guide.pdf (last accessed May 24, 2024), chapters 3-4, pp. 22-47, updated Jul. 4, 2022.

* cited by examiner

UNIFIED CODE IMAGE DEPLOYMENT ARCHITECTURE

BACKGROUND

Information processing systems increasingly utilize reconfigurable virtual resources to meet changing user needs in an efficient, flexible, and cost-effective manner. For example, cloud-based computing and storage systems implemented using virtual resources in the form of containers have been widely adopted.

SUMMARY

Illustrative embodiments of the disclosure provide a unified deployment architecture (e.g., a unified code image deployment architecture). An exemplary computer-implemented method includes obtaining a first software code package, associated with one or more software components, and information identifying a target computing environment for deploying the one or more software components on the target computing environment, and extracting, from the first software code package, one or more configuration parameters and one or more image files associated with the one or more software components, wherein the one or more image files are in a first file format. The method includes selecting a conversion process, from among a set of conversion processes, based at least in part on the target computing environment, and generating a second software code package for deploying the one or more software components on the target computing environment, wherein the generating comprises converting the one or more image files into a second file format and generating one or more instructions for deploying the one or more software components on the target computing environment. The method also includes automatically initiating one or more deployment tasks based at least in part on the second software code package.

Illustrative embodiments can provide significant advantages relative to conventional techniques. For example, some embodiments provide a unified deployment architecture for automatically deploying software components (e.g., virtual machines) in different types of hypervisor environments. The unified deployment architecture automatically converts an image corresponding to the software components based on a type of a target environment and generates instructions for deploying the converted image to the target environment.

These and other illustrative embodiments described herein include, without limitation, methods, apparatus, systems, and computer program products comprising processor-readable storage media.

DETAILED DESCRIPTION

Figure 1:
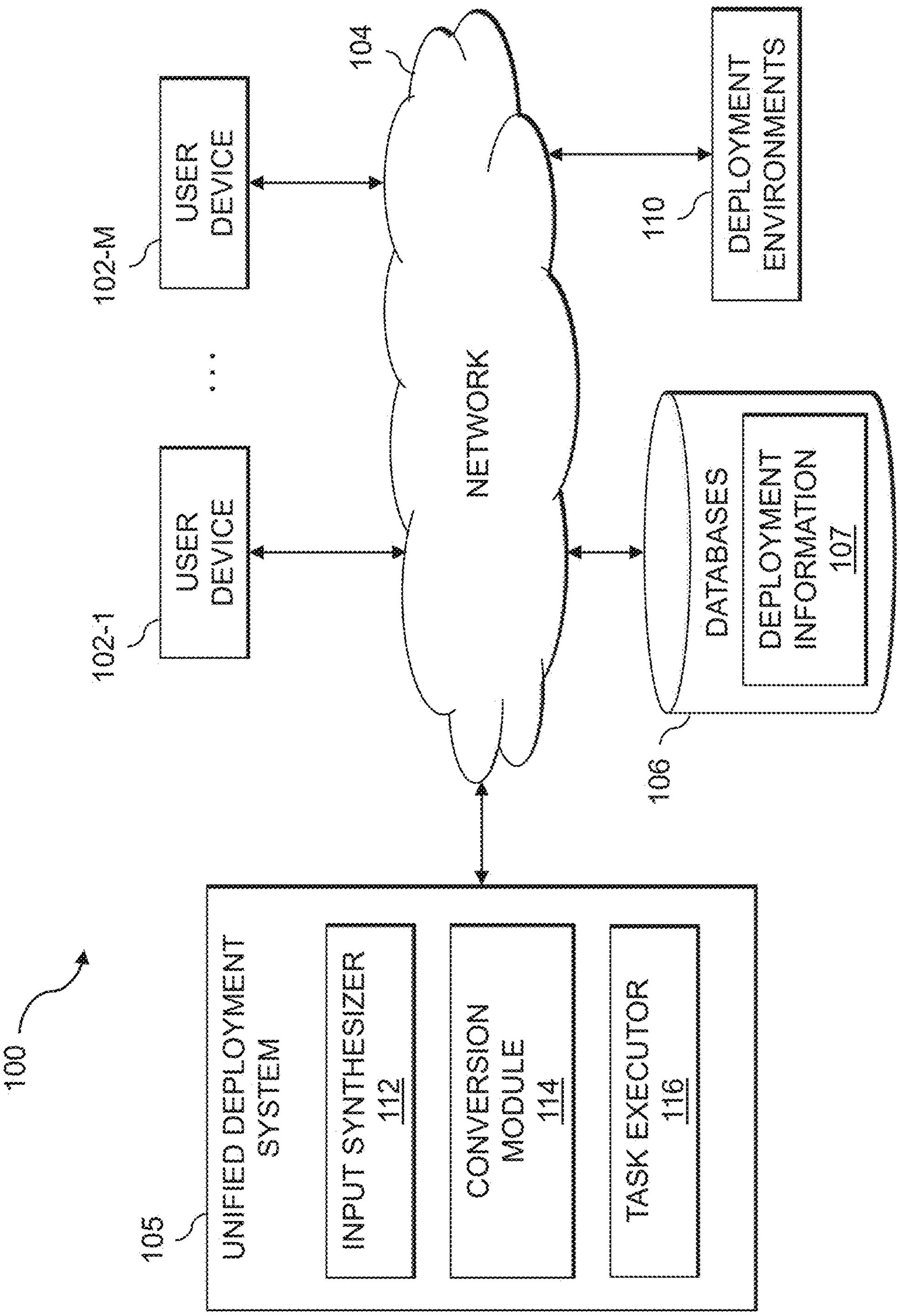
FIG. 1 shows an information processing system configured for unified deployments in an illustrative embodiment.

Networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

A hypervisor is software that allows multiple virtual machines to execute on a single physical computer, also referred to as a host machine. The hypervisor acts as a manager that allocates hardware resources (CPU, memory, and storage resources) of the host machine to each virtual machine to ensure that the virtual machines operate as if they were on separate, dedicated machines. The hypervisor can also provide isolation between virtual machines to prevent operations of the virtual machines from interfering with each other. In some examples, the hypervisor can enable multiple virtual machines, executing different operating systems, to coexist on the same physical hardware.

The term virtual machine (or VM) in this context and elsewhere herein is intended to be broadly construed so as to encompass, for example, a software program that operates independently of the underlying physical hardware. For example, the software program can correspond to a software-defined computer that executes its own operating system and applications.

The term "deployment package" (also referred to herein as a "software code package" or a "package") as used herein is intended to be broadly construed so as to encompass, for example, a file and/or a collection of files that are used to create, deploy, and/or execute software (e.g., virtual machines and/or virtual appliances) on one or more virtualization environments. A given deployment package can comprise information related to software components (e.g., operating systems, applications, and services), resource configurations (e.g., related to processing, memory, network interface, and/or storage resources), software dependencies (e.g., external libraries or packages), certificates, one or more disk images, and/or other types of auxiliary information used for creating, deploying, and/or executing software on such virtualization platforms.

There are multiple types of deployment file formats that are used for creating deployment packages. For example, OVF (Open Virtualization Format) is an open standard format for packaging and deploying software (e.g., VMs). An OVF file typically includes metadata and possibly one or more disk images (e.g., virtual machine disk images). An OVF file is often packaged as an Open Virtual Appliance (OVA) file. Generally, an OVA file is an archive file comprising the collection of files from the OVF package and the corresponding disk images. Accordingly, a given OVA file can include a configuration file (e.g., an OVF file) and the corresponding one or more disk images. Other deployment file formats include Virtual Hard Disk (VHD) format, a Quick Emulator (QEMU) Copy-On-Write version 2 (QCOW2) format, and other types of virtual disk image formats or packaging standards.

Direct deployment of OVA deployment packages is often limited to particular hypervisor environments (e.g., bare metal hypervisor environments). Deploying OVA files to other types of hypervisor environments, such as kernel-based virtual machine (KVM) environments, often includes a user manually converting the OVA file to an image type that is suitable for the intended hypervisor environment.

Unlike OVA files, virtual disk files used in other types of hypervisor environments (such as VHD files for a first type of virtualization environment and QCOW2 files for KVM environments), often do not have a predefined resource configuration (e.g., from a publisher), which is generally required for deployment. Thus, a user may be required to manually obtain information related to the resource details from various sources (e.g., a configuration guide and/or release notes) and then generate a command for installing the VM. When products associated with such VMs are sent to users, the same VM is often published in multiple formats (e.g., OVA, QCOW2, VHD, etc.) and deployment guidelines for each of the formats are also provided. This can increase the amount of required resources (e.g., storage resources) as well as the overall size and cost of the product being shipped.

Embodiments described herein provide a unified deployment architecture that can automate the deployment process of VMs. For example, some embodiments automatically extract VM deployment parameters (e.g., CPU, memory, storage, and/or network parameters) from an OVF configuration file, and then convert a disk image of the VM to accommodate various hypervisor formats. In at least one embodiment, the VM deployment parameters can be automatically extracted based on a set of key-value pairs, where the values of such VM parameters are identified and extracted by searching the OVF configuration file using the keys. Depending on the implementation, the keys can include, for example, "Capacity", "Memory", "Number of CPUs", etc.

In at least some embodiments, the VM can be automatically deployed in a designated hypervisor environment. Accordingly, the unified deployment architecture can provide a unified framework for automatically deploying VMs across various types of hypervisor environments.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a unified deployment system 105 and one or more deployment environments 110.

The user devices 102 and/or the deployment environments 110 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 and/or the deployment environments 110 in some embodiments comprise respective computers associated with a particular company, organization, or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software, or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the unified deployment system 105 can have at least one associated database 106 configured to store deployment information 107 pertaining to, for example, resource configurations, disk images, and/or other information related to virtualized deployments.

An example database 106, such as depicted in the present embodiment, can be implemented using one or more storage systems associated with the unified deployment system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the unified deployment system 105 are one or more input-output devices, which illustratively comprise keyboards, displays or other types of input-output devices in any combination. Such input-output devices can be used, for example, to support one or more user interfaces to the unified deployment system 105, as well as to support communication between the unified deployment system 105 and other related systems and devices not explicitly shown.

Additionally, the unified deployment system 105 in the FIG. 1 embodiment is assumed to be implemented using at least one processing device. Each such processing device generally comprises at least one processor and an associated memory, and implements one or more functional modules for controlling certain features of the unified deployment system 105.

More particularly, the unified deployment system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the unified deployment system 105 to communicate over the network 104 with the user devices 102 and/or the deployment environments 110, and illustratively comprises one or more conventional transceivers.

The unified deployment system 105 further comprises an input synthesizer 112, a conversion module 114, and a task executor 116.

Generally, the input synthesizer 112 obtains and processes a set of inputs (e.g., from one or more of the user devices 102). The set of inputs can include, for example, a deployment package, a target deployment environment, and/or a task.

In some embodiments, the conversion module 114 converts extracted image files into various formats (e.g., OVA to QCOW2 or VHD) based on the target deployment environment. The conversion module 114 is also configured to process the configuration file to determine deployment instructions for deploying one or more disk images to one or more of the deployment environments 110.

The task executor 116 can be configured to execute one or more tasks, such as tasks specified in the set of inputs. In some embodiments, a print task can include the task executor 116 outputting the converted disk image and deployment instructions to a user (e.g., to one or more of the user devices 102) without deploying the disk image. For a deploy task, the task executor 116 can automatically deploy the one or more converted disk images to the target deployment environment, for example.

It is to be appreciated that this particular arrangement of elements 112, 114 and 116 illustrated in the unified deployment system 105 of the FIG. 1 embodiment is presented by way of example only, and alternative arrangements can be used in other embodiments. For example, the functionality associated with the elements 112, 114 and 116 in other embodiments can be combined into a single element, or separated across a larger number of elements. As another example, multiple distinct processors can be used to implement different ones of the elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for unified deployment system 105 involving user devices 102 and the deployment environments 110 of computer network 100 is presented by way of illustrative example only, and in other embodiments additional or alternative elements may be used. Thus, another embodiment includes additional or alternative systems, devices, and other network entities, as well as different arrangements of elements and other components. For example, in at least one embodiment, one or more of the unified deployment system 105, the deployment environments 110, and the at least one database 106 can be on and/or part of the same processing platform.

An exemplary process utilizing elements 112, 114 and 116 of an example unified deployment system 105 in computer network 100 will be described in more detail with reference to, for example, the flow diagram of FIG. 5.

Figure 2:
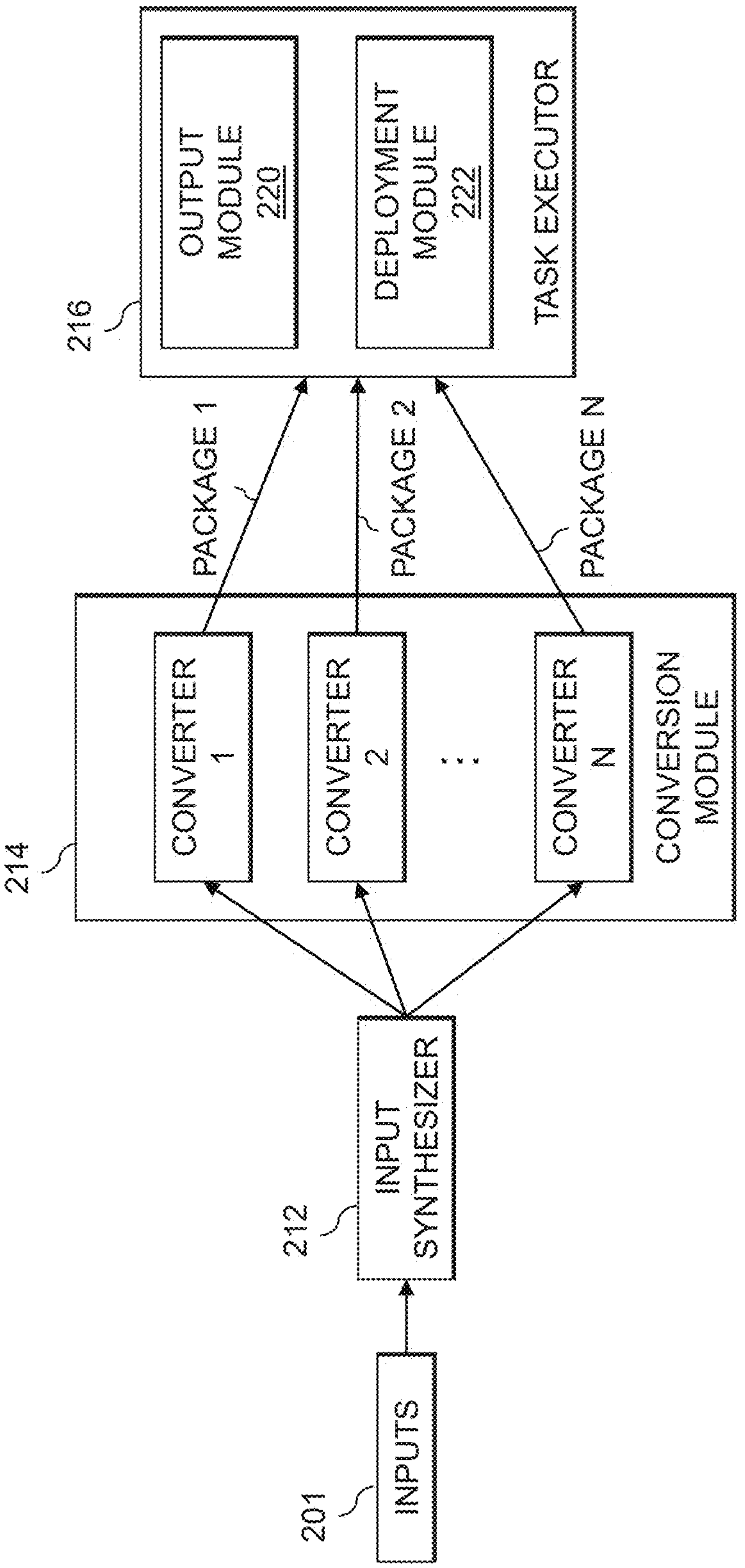
FIG. 2 shows a unified deployment architecture in an illustrative embodiment.

FIG. 2 shows a unified deployment architecture in an illustrative embodiment. The unified deployment architecture includes an input synthesizer 212; a conversion module 214 comprising a plurality of converters (1, . . . , N); and a task executor 216 comprising an output module 220 and a deployment module 222.

The input synthesizer 212 obtains and processes a set of inputs 201 (e.g., user inputs obtained from one or more of the user devices 102). The set of inputs 201 can include an image file (e.g., an OVA file), a target computing environment (e.g., from among the deployment environments 110), and one or more tasks. The image file in the set of inputs 201 may include a combination of a configuration file (e.g., an OVF file) and a disk image, for example. The one or more tasks can include, for example, a deploy task and a print task as explained in more detail below.

The input synthesizer 212 can process the set of inputs 201 to extract one or more disk images in a designated file format (e.g., a virtual machine disk (VMDK) file format) and a configuration file (e.g., an OVF file) from the deployment package. The configuration file may include, for example, one or more configuration parameters associated with deploying the one or more disk images. The extracted disk images and the configuration file are then provided to the conversion module 214.

According to some embodiments, the converters of the conversion module 214 can be configured to convert the outputs of the input synthesizer 212 into respective packages 1, 2, . . . , N. It is assumed that each converter corresponds to a different type of computing environment (e.g., hypervisor environment). By way of example, the deployment package that is provided in the set of inputs 201 may be provided in a first file format (e.g., an OVA format) and the conversion module 214 can convert the deployment package into one or more other file formats (e.g., a QCOW2 file format or a VHD file format) based on the type of target computing environment requested in the set of inputs 201. The conversion module 214 can also analyze the configuration file to determine deployment instructions for deploying the one or more disk images to the target computing environment. The conversion module 214 outputs the package corresponding to the target computing environment to the task executor 216.

The task executor 216 can be configured to execute the one or more tasks specified in the set of inputs 201 using its output module 220 and deployment module 222. For a print task, the output module 220 outputs the converted disk image and the deployment instructions (e.g., to one or more user devices 102) without deploying the disk image. For a deploy task, the deployment module 222 can automatically deploy the converted disk image to the target computing environment in accordance with the generated instructions.

Consider an example where one of the converters (e.g., converter 1) of the conversion module 214 corresponds to a first type of target computing environment (e.g., a KVM environment). If the first type of target environment is specified in the set of inputs 201, then converter 1 is selected to process the image file and the configuration parameters output by the input synthesizer 212. Converter 1 then converts the image file into a file format suitable for the KVM environment (e.g., a QCOW2 image) by applying a conversion process. The conversion process may correspond to a machine emulation process, such as a QEMU process. Converter 1 can also generate instructions for deploying the image file to the KVM environment. The instructions, in some embodiments, can include one or more command-line interface commands for deploying the QCOW2 image to the KVM environment with a designated resource configuration. Converter 1 outputs the instructions and the QCOW2 image as package 1 to the task executor 216.

Figure 3:
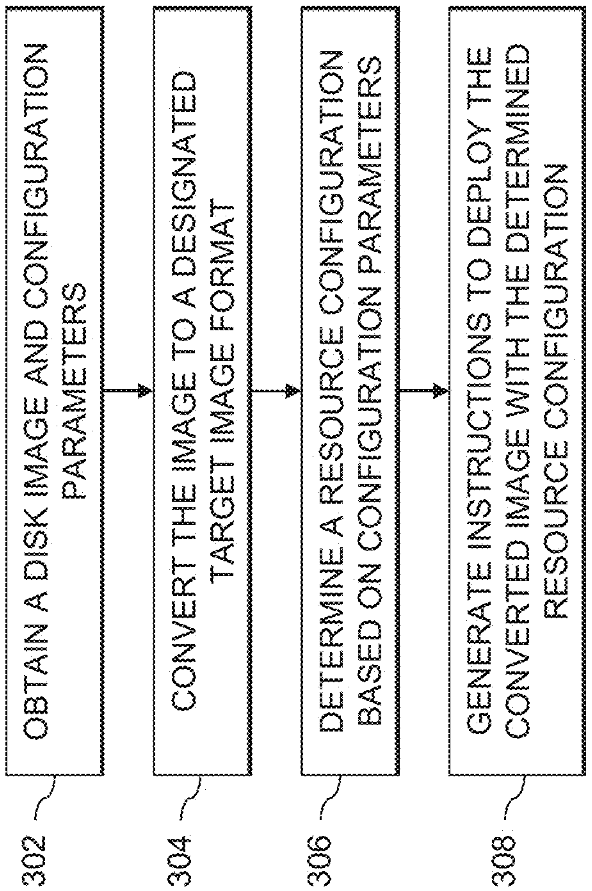
FIG. 3 shows a flow diagram of a conversion process in an illustrative embodiment.

FIG. 3 shows a flow diagram of a conversion process in an illustrative embodiment. It is to be understood that this particular process is only an example, and additional or alternative processes can be carried out in other embodiments.

In this embodiment, the process includes steps 302 through 308. These steps are assumed to be performed by a given one of the converters of the conversion module 214. For example, it is assumed that a disk image is to be converted into a designated target image format of the target computing environment. The designated target image format can comprise a QCOW2 image or a VHD image, as non-limiting examples.

Step 302 includes obtaining the disk image and one or more configuration parameters. For example, the one or more configuration parameters can be associated with resource allocations (e.g., related to processing, memory, network interface, and/or storage resources), software dependencies, operating system settings, network settings, application settings, and/or certificates for deploying the disk image.

Step 304 includes converting the disk image to a designated target image format (e.g., a QCOW2 image or a VHD image) of the target computing environment. For example, the conversion process may utilize a machine emulation process as described in more detail elsewhere herein.

Step 306 includes determining a resource configuration based on the configuration parameters.

Step 308 includes generating instructions to deploy the converted disk image with the determined resource configuration in the target computing environment.

Figure 4:
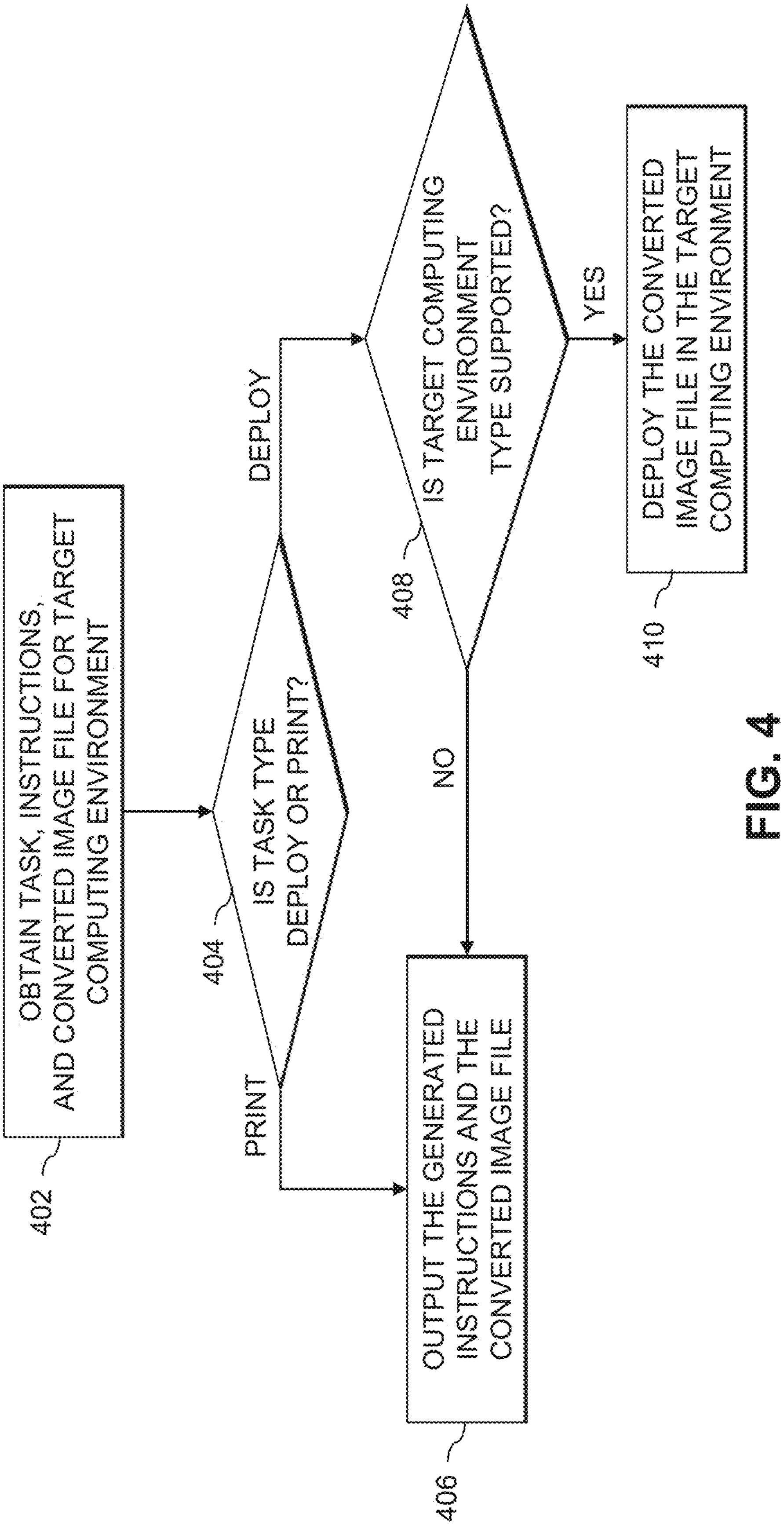
FIG. 4 shows a flow diagram of a task execution process in an illustrative embodiment.

It is to be appreciated that, in some embodiments, each converter of the conversion module 214 can implement a different conversion process (e.g., converter 1 can convert an image file into QCOW2 file format, converter 2 can convert an image file into a VHD image, etc.). FIG. 4 shows a flow diagram of a task execution process in an illustrative embodiment. It is to be understood that this particular process is only an example, and additional or alternative processes can be carried out in other embodiments.

In this embodiment, the process includes steps 402 through 410. These steps are assumed to be performed by the task executor 216.

Step 402 includes obtaining a task, instructions, and a converted image file for a target computing environment.

Step 404 includes a test to check whether the task type is a deploy task or a print task. If the task type is a print task, then step 406 is performed, which includes outputting the generated instructions and the converted image (e.g., to one or more of the user devices 102).

If the task type is a deploy task, then step 408 is performed, which includes a test to check whether the target computing environment type is supported. For example, the target computing environment type (e.g., specified by a user in the set of inputs 201) can be compared to one or more types of computing environments that are currently available to the user. If the result of step 408 is yes, then step 410 includes deploying the converted image in the target computing environment.

If the result of step 408 is no, then step 406 is performed, which outputs the generated instructions and the converted image. Step 406 can alternatively or additionally include outputting an error indicating that the target computing environment type is not supported.

Figure 5:
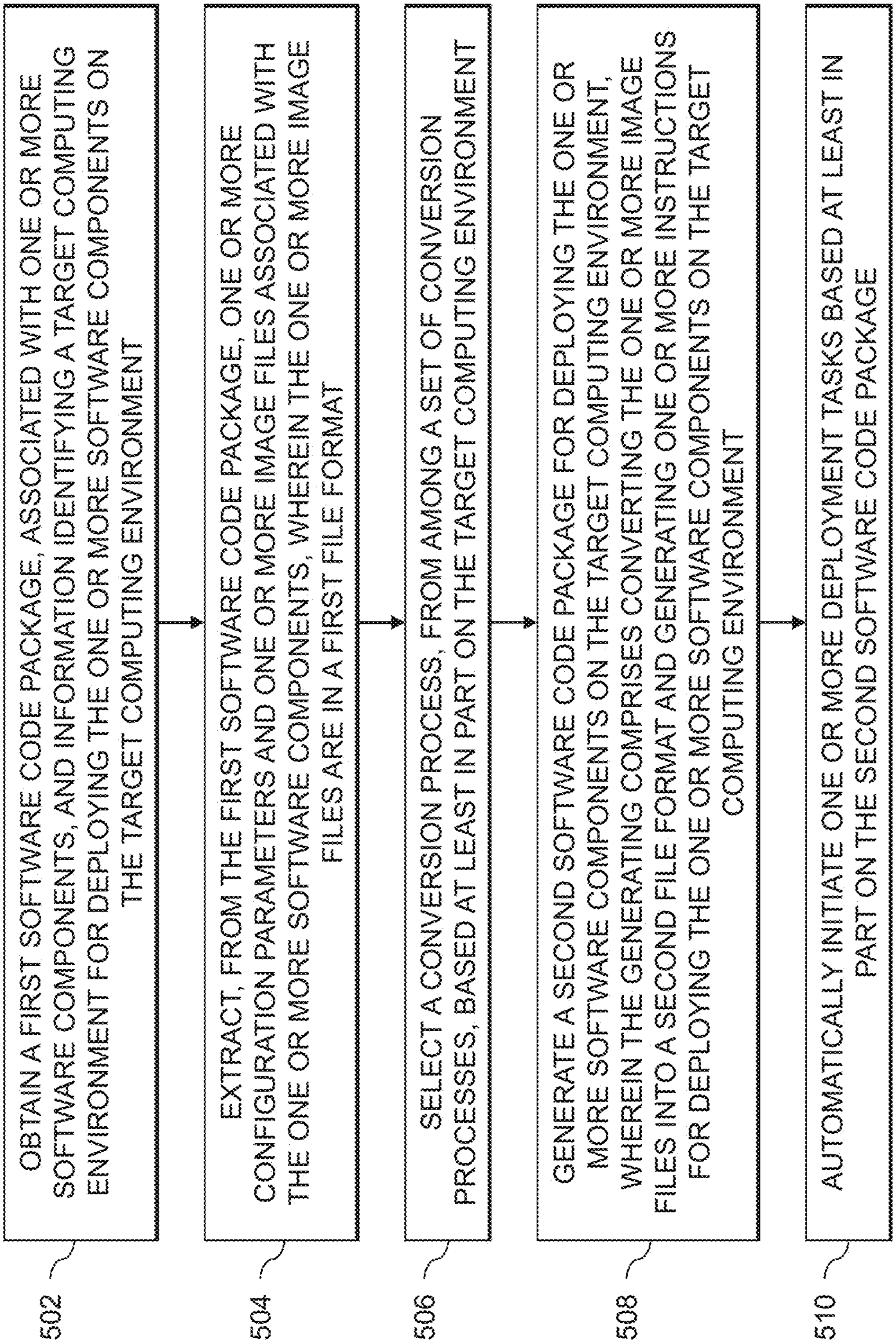
FIG. 5 shows a flow diagram of a unified deployment process in an illustrative embodiment.

FIG. 5 is a flow diagram of a process for unified virtualization deployments in an illustrative embodiment. It is to be understood that this particular process is only an example, and additional or alternative processes can be carried out in other embodiments.

In this embodiment, the process includes steps 502 through 510. These steps are assumed to be performed by the unified deployment system 105 utilizing its elements 112, 114 and 116.

Step 502 includes obtaining a first software code package, associated with one or more software components, and information identifying a target computing environment for deploying the one or more software components on the target computing environment.

Step 504 includes extracting, from the first software code package, one or more configuration parameters and one or more image files associated with the one or more software components, wherein the one or more image files are in a first file format.

Step 506 includes selecting a conversion process, from among a set of conversion processes, based at least in part on the target computing environment.

Step 508 includes generating a second software code package for deploying the one or more software components on the target computing environment, wherein the generating comprises converting the one or more image files into a second file format and generating one or more instructions for deploying the one or more software components on the target computing environment.

Step 510 includes automatically initiating one or more deployment tasks based at least in part on the second software code package.

The one or more deployment tasks may include automatically deploying at least a portion of the one or more software components on the target computing environment using the converted one or more image files and the generated instructions. Automatically deploying the portion of the one or more software components may include determining whether the target computing environment supports the one or more software components.

The one or more deployment tasks may include automatically providing the one or more image files in the second file format and the generated one or more instructions for deploying the one or more software components on the target computing environment to at least one other processing device.

The one or more software components may include one or more virtual machines, and the target computing environment may include a hypervisor environment.

The target computing environment may lack support for deploying the one or more software components using the first file format.

The second file format may be designed specifically for the target computing environment.

The one or more configuration parameters may be associated with one or more virtualized resource allocation settings, one or more operating system settings, one or more network settings, and/or one or more application settings. The second software code package may include the one or more extracted configuration parameters.

In some embodiments, the first software code package can be considered an input package (e.g., provided by a user), and the second software code package can be considered an output package, which can be output to the user and/or used for deploying the one or more software components.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments can provide significant advantages relative to conventional approaches. For example, at least some embodiments provide a unified deployment architecture for automatically deploying software components (e.g., virtual machines) directly in different types of hypervisor environments without having to perform manual conversions and/or configurations. In some embodiments, the unified deployment architecture advantageously enables users to automatically deploy OVAs in one or more designated hypervisor environments, which can increase deployment efficiency (e.g., by reducing computing resources).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories, and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
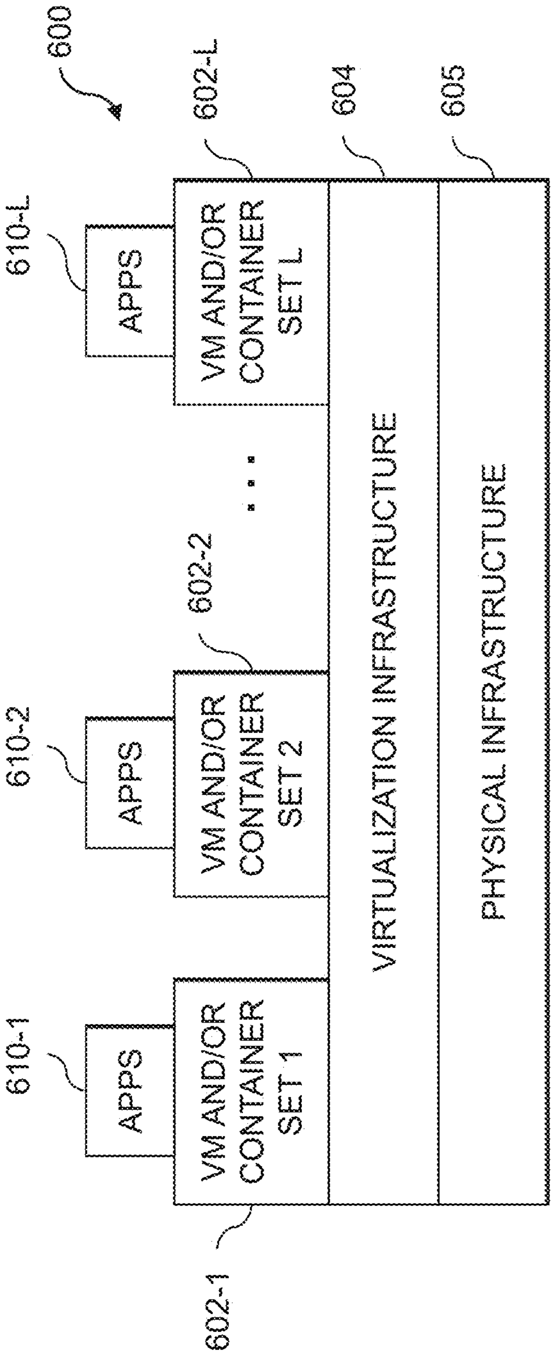
FIGS. 6 and 7 show examples of processing platforms that may be utilized to implement at least a portion of an information processing system in illustrative embodiments.
Figure 7:
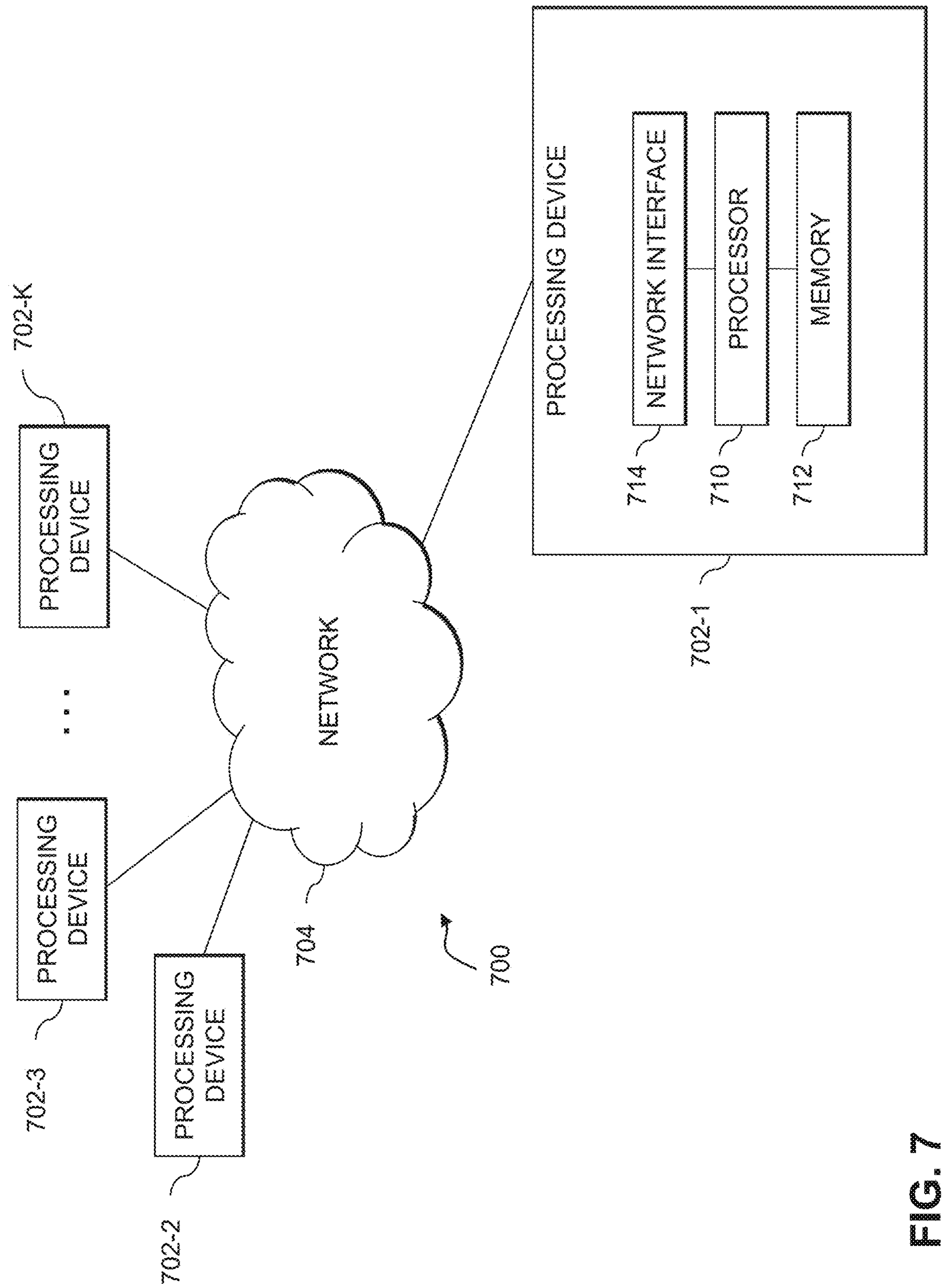

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple VMs and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an ASIC, an FPGA, or other type of processing circuitry, as well as portions or combinations of such circuitry elements.

The memory 712 comprises RAM, ROM or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk, or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems, and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining a first software code package, associated with one or more software components, and information identifying a target computing environment for deploying the one or more software components on the target computing environment;

extracting, from the first software code package, one or more configuration parameters and one or more image files associated with the one or more software components, wherein the one or more image files are in a first file format;

selecting a conversion process, from among a set of conversion processes, based at least in part on the target computing environment;

generating a second software code package for deploying the one or more software components on the target computing environment, wherein the generating comprises converting the one or more image files into a second file format and generating one or more instructions for deploying the one or more software components on the target computing environment; and automatically initiating one or more deployment tasks based at least in part on the second software code package;

wherein the method is performed by at least one processing device comprising a processor coupled to a memory.

2. The computer-implemented method of claim 1, wherein the one or more deployment tasks comprise:

automatically deploying at least a portion of the one or more software components on the target computing environment using the converted one or more image files in the second file format and the generated one or more instructions.

3. The computer-implemented method of claim 2, wherein the automatically deploying the portion of the one or more software components comprises:

determining whether the target computing environment supports the one or more software components.

4. The computer-implemented method of claim 1, wherein the one or more deployment tasks comprise:

automatically providing the one or more image files in the second file format and the generated one or more instructions for deploying the one or more software components on the target computing environment to at least one other processing device.

5. The computer-implemented method of claim 1, wherein the one or more software components comprise one or more virtual machines, and wherein the target computing environment comprises a hypervisor environment.

6. The computer-implemented method of claim 1, wherein the target computing environment lacks support for deploying the one or more software components using the first file format.

7. The computer-implemented method of claim 6, wherein the target computing environment supports the second file format.

8. The computer-implemented method of claim 1, wherein the one or more configuration parameters are associated with at least one of:

one or more virtualized resource allocation settings;
one or more operating system settings;
one or more network settings; and
one or more application settings.

9. The computer-implemented method of claim 1, wherein the second software code package comprises the one or more extracted configuration parameters.

10. A non-transitory processor-readable storage medium having stored therein program code of one or more software programs, wherein the program code when executed by at least one processing device causes the at least one processing device:

to obtain a first software code package, associated with one or more software components, and information identifying a target computing environment for deploying the one or more software components on the target computing environment;

to extract, from the first software code package, one or more configuration parameters and one or more image files associated with the one or more software components, wherein the one or more image files are in a first file format;

to select a conversion process, from among a set of conversion processes, based at least in part on the target computing environment;

to generate a second software code package for deploying the one or more software components on the target computing environment, wherein the generating comprises converting the one or more image files into a second file format and generating one or more instructions for deploying the one or more software components on the target computing environment; and to automatically initiate one or more deployment tasks based at least in part on the second software code package.

11. The non-transitory processor-readable storage medium of claim 10, wherein the one or more deployment tasks comprise:

automatically deploying at least a portion of the one or more software components on the target computing environment using the converted one or more image files in the second file format and the generated one or more instructions.

12. The non-transitory processor-readable storage medium of claim 11, wherein the automatically deploying the portion of the one or more software components comprises:

determining whether the target computing environment supports the one or more software components.

13. The non-transitory processor-readable storage medium of claim 10, wherein the one or more deployment tasks comprise:

automatically providing the one or more image files in the second file format and the generated one or more instructions for deploying the one or more software components on the target computing environment to at least one other processing device.

14. The non-transitory processor-readable storage medium of claim 10, wherein the one or more software components comprise one or more virtual machines, and wherein the target computing environment comprises a hypervisor environment.

15. The non-transitory processor-readable storage medium of claim 10, wherein the target computing environment lacks support for deploying the one or more software components using the first file format.

16. An apparatus comprising:

at least one processing device comprising a processor coupled to a memory;

the at least one processing device being configured:

to obtain a first software code package, associated with one or more software components, and information identifying a target computing environment for deploying the one or more software components on the target computing environment;

to extract, from the first software code package, one or more configuration parameters and one or more image files associated with the one or more software components, wherein the one or more image files are in a first file format;

to select a conversion process, from among a set of conversion processes, based at least in part on the target computing environment;

to generate a second software code package for deploying the one or more software components on the target computing environment, wherein the generating comprises converting the one or more image files into a second file format and generating one or more instructions for deploying the one or more software components on the target computing environment; and to automatically initiate one or more deployment tasks based at least in part on the second software code package.

17. The apparatus of claim 16, wherein the one or more deployment tasks comprise:

automatically deploying at least a portion of the one or more software components on the target computing environment using the converted one or more image files in the second file format and the generated one or more instructions.

18. The apparatus of claim 17, wherein the automatically deploying the portion of the one or more software components comprises:

determining whether the target computing environment supports the one or more software components.

19. The apparatus of claim 16, wherein the one or more deployment tasks comprise:

automatically providing the one or more image files in the second file format and the generated one or more instructions for deploying the one or more software components on the target computing environment to at least one other processing device.

20. The apparatus of claim 16, wherein the one or more software components comprise one or more virtual machines, and wherein the target computing environment comprises a hypervisor environment.

* * * * *